(No Model.)

T. J. LONGACRE.
TREE PROTECTOR.

No. 304,835. Patented Sept. 9, 1884.

WITNESSES:
Donn Twitchell
C. Sedgwick

INVENTOR:
T. J. Longacre
BY Munn & Co.
ATTORNEYS.

UNITED STATES PATENT OFFICE.

THOMAS J. LONGACRE, OF KINGSVILLE, MISSOURI.

TREE-PROTECTOR.

SPECIFICATION forming part of Letters Patent No. 304,835, dated September 9, 1884.

Application filed March 17, 1884. (No model.)

*To all whom it may concern:*

Be it known that I, THOMAS J. LONGACRE, of Kingsville, in the county of Johnson and State of Missouri, have invented a new and Improved Tree-Protector, of which the following is a full, clear, and exact description.

The object of my invention is to provide an easily-applied and efficient protector for fruit and other trees, for the purpose of protecting them from the attacks of vermin and other pests.

Reference is to be had to the accompanying drawings, forming a part of this specification, in which similar letters of reference indicate corresponding parts in both the figures.

Figure 1:
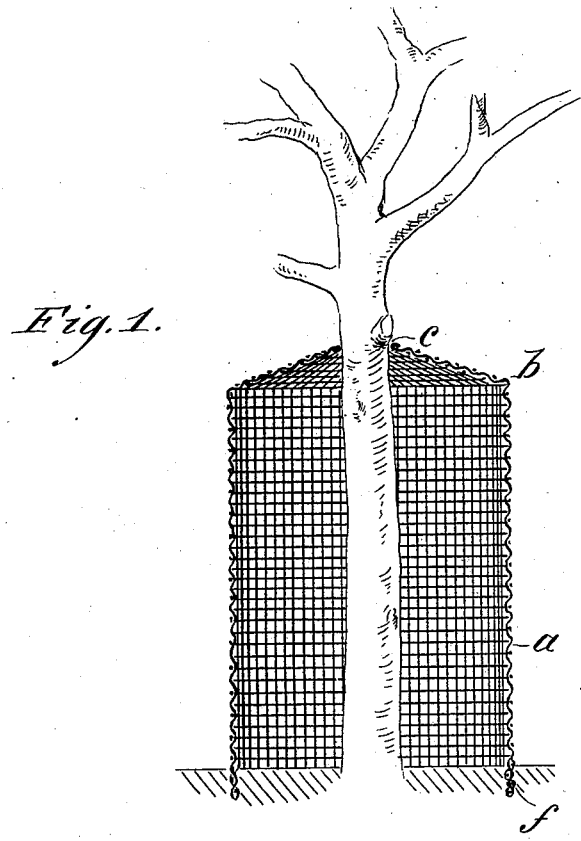
Figure 2:
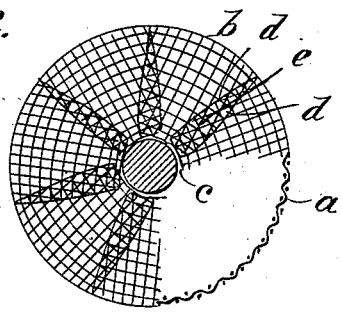

Figure 1 is a sectional elevation of one of my protectors shown as applied to a tree; and Fig. 2 is a plan view of the same, the tree being shown in section.

For the purpose of my invention, I take a sheet or strip, $a$, of wire-cloth, of a fineness of mesh suited to the purpose, and of a sufficient length to extend as high up on the trunk of the tree as is needful, and to allow for forming the top of the protector, and bend the said strip at a suitable angle at $b$ at a distance from the edge $c$ nearly or quite equal to radii of a circle of the required size of the protector to be made. The trunk of the tree at the center will then cause the top to assume a cone shape, as shown in Fig. 1. I then crease or bend the turned-up portion at $d$ to form the ridges $e$, as shown in Fig. 2. I then form a shallow trench around the tree, in which I place the lower edge, $f$, at the same time bending the wire-cloth $a$ around the tree, so that its edges lap slightly. I then sew the edges of the wire-cloth together with fine wire or cord, or join them in any suitable manner, and fill in the earth around the base of the protector. In lapping and sewing the edges of the wire-cloth at the top, care should be taken that the edge $c$ comes quite close to the tree. Having now joined and secured the protector in place around the tree, I bend the ridges $e$ down flat upon the top of the protector.

Plain, galvanized, or painted wire-cloth may be used.

This protector is cheap, easily made and put in place around a tree, and forms a sure safeguard against damage from mice, rabbits, tree-worms, or other pests. It protects from damage from borers by preventing the moth from laying her eggs in the bark of the tree. The cone-shaped top permits the top to expand with the growth of the tree.

Having thus described my invention, what I claim as new, and desire to secure by Letters Patent, is—

The tree-protector comprising the cylindric wire-cloth inclosure $a$, with a conical or turned-up portion, $d$, having an apertured apex, said conical portion being creased or bent to form radial ridges $e$ thereon, said inclosure having at its bottom edges extensions $f$, entering the ground to anchor said edges, substantially as and for the purpose set forth.

THOMAS J. LONGACRE.

Witnesses:
JAMES E. MCCLURE,
WILLIAM POWELL.